(12) United States Patent
Yeh et al.

(10) Patent No.: US 11,543,312 B2
(45) Date of Patent: Jan. 3, 2023

(54) SPINDLE SHAFT DEVICE WITH TORQUE SENSOR

(71) Applicant: INDUSTRIAL TECHNOLOGY RESEARCH INSTITUTE, Hsinchu (TW)

(72) Inventors: Chien-Nan Yeh, Tainan (TW); Pei-Yu Chang, Tainan (TW); Shih-Ting Lin, Hualien (TW); Chao-Ta Huang, Hsinchu (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 144 days.

(21) Appl. No.: 17/234,263

(22) Filed: Apr. 19, 2021

(65) Prior Publication Data
US 2022/0187149 A1 Jun. 16, 2022

(30) Foreign Application Priority Data
Dec. 11, 2020 (TW) ................. 109143847

(51) Int. Cl.
*G01L 3/10* (2006.01)
*H02K 21/22* (2006.01)
(Continued)

(52) U.S. Cl.
CPC ............. *G01L 3/108* (2013.01); *H02K 21/22* (2013.01); *B62J 45/411* (2020.02); *B62J 45/42* (2020.02)

(58) Field of Classification Search
CPC ....... G01L 3/108; G01L 3/104; G01L 5/0042; H02K 21/22; H02K 1/2792; H02K 7/003;
(Continued)

(56) References Cited

U.S. PATENT DOCUMENTS 7,093,504 B2 * 8/2006 Southward ............. G01L 3/109
73/862.08
7,861,599 B2   1/2011 Meggiolan
(Continued)

FOREIGN PATENT DOCUMENTS

CN           1846123 B      9/2010
CN        102227651 A      10/2011
(Continued)

OTHER PUBLICATIONS

TW Office Action in Application No. 109143847 dated Jul. 12, 2021.
(Continued)

*Primary Examiner* — Freddie Kirkland, III
(74) *Attorney, Agent, or Firm* — Maschoff Brennan

(57) ABSTRACT

A spindle shaft device including a shaft, a first torque sensor, and a second torque sensor. The shaft extends along an axial direction and comprises a first side portion, a second side portion, and a central portion located between the first side portion and the second side portion. The central portion has a central torsional rigidity with respect to the axial direction. The first side portion has a first torsional rigidity with respect to the axial direction. The second side portion has a second torsional rigidity with respect to the axial direction. The first torsional rigidity is smaller than the central torsional rigidity. The second torsional rigidity is smaller than the central torsional rigidity. The first torque sensor is disposed on the first side portion. The second torque sensor is disposed on the second side portion.

20 Claims, 8 Drawing Sheets

(51) Int. Cl.
*B62J 45/42* (2020.01)
*B62J 45/411* (2020.01)

(58) Field of Classification Search
CPC ......... H02K 11/24; B62J 45/411; B62J 45/42; B62J 45/421; B62M 6/50; F16C 3/02
See application file for complete search history.

(56) References Cited

U.S. PATENT DOCUMENTS

| | | | |
|---|---|---|---|
| 8,006,574 B2 | 8/2011 | Meyer | |
| 8,651,993 B1 | 2/2014 | Watarai | |
| 8,655,534 B2 | 2/2014 | Yang et al. | |
| 8,844,377 B2 | 9/2014 | Yap | |
| 9,004,221 B2* | 4/2015 | Yoshida | G01L 3/104 180/443 |
| 9,329,093 B2* | 5/2016 | Chana | G01L 3/10 |
| 9,616,968 B1 | 4/2017 | Hu et al. | |
| 9,809,276 B2 | 11/2017 | Katsura et al. | |
| 10,401,242 B2* | 9/2019 | Hourne | G01L 3/105 |
| 2005/0044968 A1* | 3/2005 | Southward | G01L 3/109 73/862.324 |
| 2006/0207348 A1* | 9/2006 | Brandl | G01L 3/104 73/862.331 |
| 2010/0101321 A1 | 4/2010 | Moody | |
| 2012/0048634 A1 | 3/2012 | Kuroki et al. | |
| 2014/0182393 A1 | 7/2014 | Heinkel et al. | |
| 2016/0052583 A1 | 2/2016 | Sasaki | |
| 2017/0313379 A1 | 11/2017 | Gao | |
| 2017/0320539 A1 | 11/2017 | Gao | |
| 2019/0344857 A1 | 11/2019 | Fossato et al. | |
| 2020/0010203 A1 | 1/2020 | Ho et al. | |

FOREIGN PATENT DOCUMENTS

| | | |
|---|---|---|
| CN | 102514679 A | 6/2012 |
| CN | 111361682 A | 7/2020 |
| TW | M417320 U | 12/2011 |
| TW | M453843 U | 5/2013 |
| TW | 201607833 A | 3/2016 |
| TW | 201720711 A | 6/2017 |
| TW | 202012900 A | 4/2020 |

OTHER PUBLICATIONS

Abagnale et al., "Design and Development of an Innovative E-Bike" Science Direct, Sep. 2016.

Tseng, Yu-Chien, "Global bicycle and electric bicycle market trend analysis" IEKConsulting, Jun. 18, 2019.

Daniels, Doug, "Sensor Technologies for Determining Cyclist Power Output: A Comparison of Smartphone, Opposing Force and Strain Gauge Power Measurement Technologies Using Spatial Analysis" Geographic Information Science and Technology, May 2017.

* cited by examiner

SPINDLE SHAFT DEVICE WITH TORQUE SENSOR

CROSS-REFERENCE TO RELATED APPLICATIONS

This non-provisional application claims priority under 35 U.S.C. § 119(a) on Patent Application No(s). 109143847 filed in Taiwan (R.O.C.) on Dec. 11, 2020, the entire contents of which are hereby incorporated by reference.

TECHNICAL FIELD

The disclosure relates to a spindle shaft device, more particularly to a spindle shaft device with torque sensor.

BACKGROUND

Today's electric-assisted bicycles (also known as "motor-assisted bicycle") are equipped with torque sensors to detect the force the user pedals the bicycle. Based on the feedback of the sensor, the electric-assisted bicycle can convert electrical energy into kinetic energy to help users tackle ascends and hills, and can stop converting electrical energy into kinetic energy when coasting on flat terrain or downhill so as to operate in a power-saving mode. Accordingly, the electric-assisted bicycles have become popular due to general ease of use when riding on a variety of terrains.

However, most of the electric-assisted bicycles have problems, such as inaccurate torque measurement and long response time, failing to timely reflecting the actual pedal force and pedaling cadences.

SUMMARY

One embodiment of the disclosure provides a spindle shaft device including a shaft, a first torque sensor, and a second torque sensor. The shaft extends along an axial direction and comprises a first side portion, a second side portion, and a central portion located between the first side portion and the second side portion. The central portion has a central torsional rigidity with respect to the axial direction. The first side portion has a first torsional rigidity with respect to the axial direction. The second side portion has a second torsional rigidity with respect to the axial direction. The first torsional rigidity is smaller than the central torsional rigidity. The second torsional rigidity is smaller than the central torsional rigidity. The first torque sensor is disposed on the first side portion. The second torque sensor is disposed on the second side portion.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Figure 1:
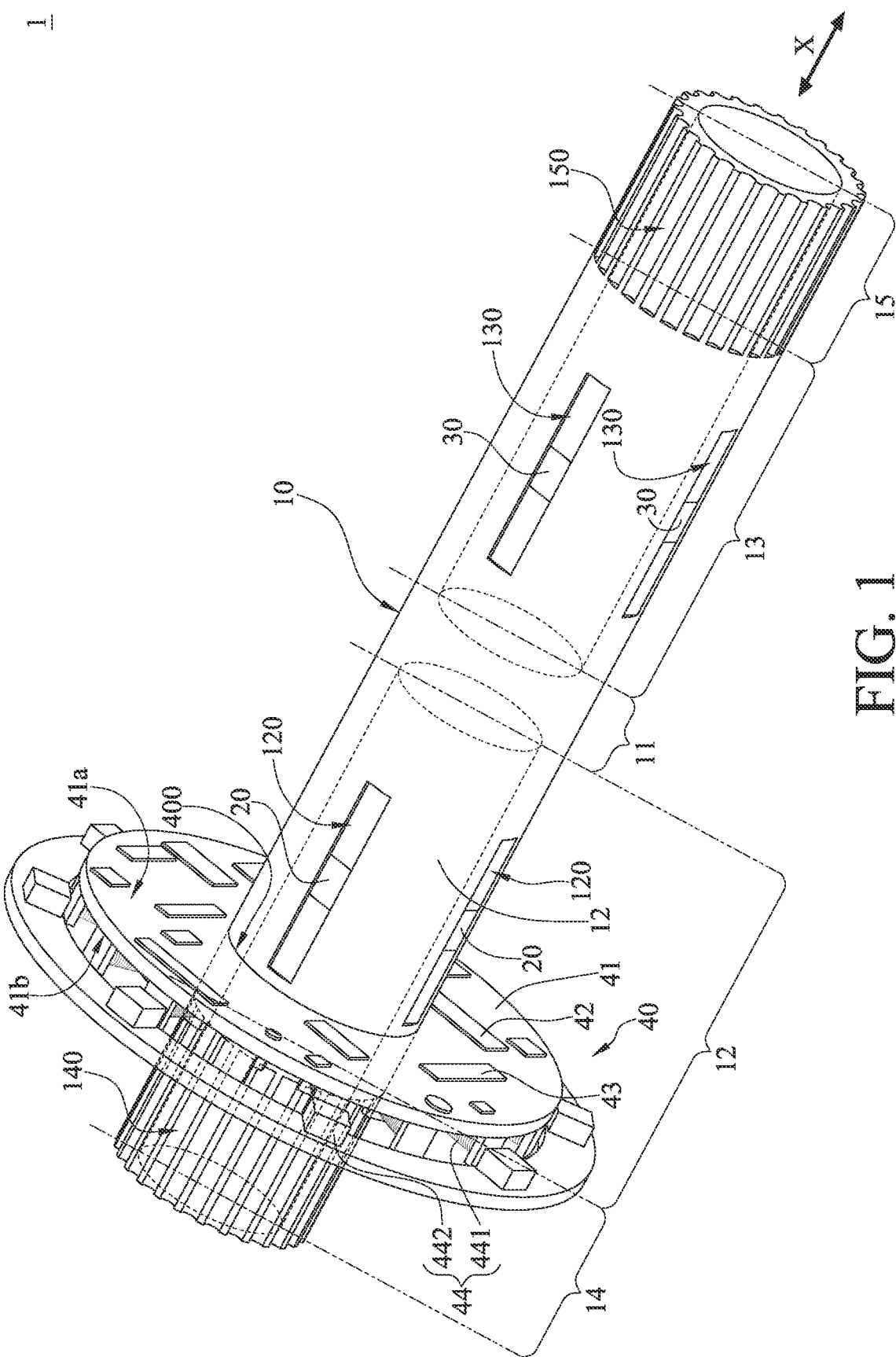
FIG. 1 is a perspective view of a spindle shaft device according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details.

The following embodiments will be described with reference to the drawings.

For the purpose of clear illustration, some conventional elements and components may be illustrated in a simple and clear manner. Some of the features in the drawings may be slightly exaggerated or illustrated in a larger proportion for the ease of viewing but are not intended to limit the disclosure. The spatial terms used herein are for the purpose of clear illustration and not intended to limit the disclosure.

Figure 2:
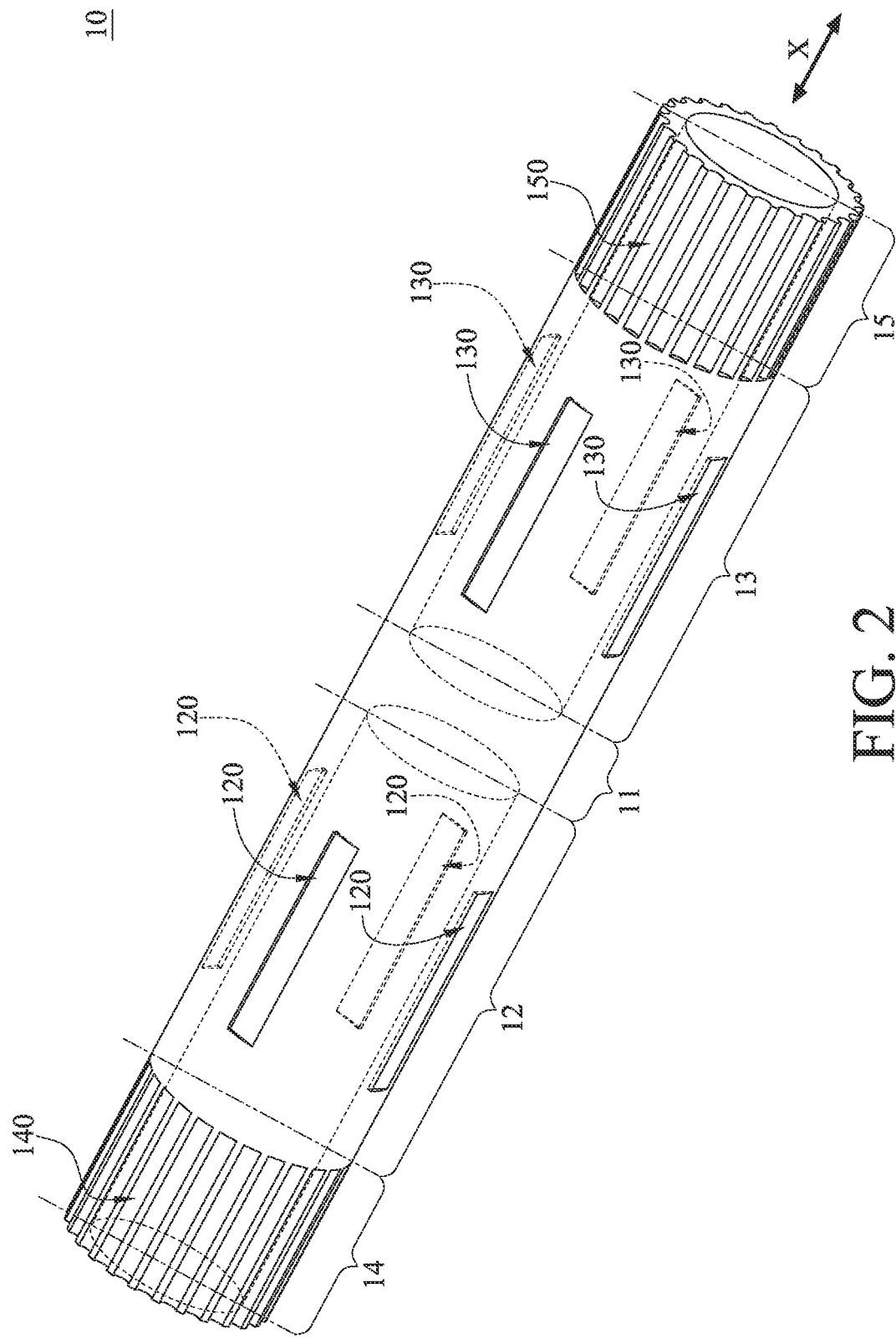
FIG. 2 is a perspective view of a shaft in FIG. 1.

Referring to FIG. 1 and FIG. 2, where FIG. 1 is a perspective view of a spindle shaft device according to one embodiment of the disclosure, and FIG. 2 is a perspective view of a shaft in FIG. 1.

As shown in FIGS. 1 and 2, in this embodiment, a spindle shaft device 1 includes a shaft 10, a plurality of first torque sensors 20, a plurality of second torque sensors 30, and a circuit module 40. The present disclosure provides a spindle shaft device with one or more torque sensors to accurately and timely detect the torque applied to the shaft.

The shaft 10 extends in an axial direction X. The shaft 10 includes a central portion 11, a first side portion 12, a second side portion 13, a first connection portion 14, and a second connection portion 15. The central portion 11 is located between and connected to the first side portion 12 and the second side portion 13. In this embodiment, the first side portion 12 has four first recesses 120. Each of the first recesses 120 has a long side extending in a direction substantially parallel to the axial direction X. The second side portion 13 has four second recesses 130. Each of the second recesses 130 has a long side extending in a direction substantially parallel to the axial direction X. In other embodiments, the quantities of the first recess 120 and the second recess 130 are exemplary and not intended to limit the disclosure. In addition, in other embodiments, the long sides of the first recesses 120 and the second recesses 130 may extend in a direction not parallel to the axial direction of the shaft.

In this embodiment, the first connection portion 14 is arranged at the outer end of the first side portion 12, and the first side portion 12 is located between the central portion 11 and the first connection portion 14. The first connection portion 14 has outer teeth 140 on an outer surface thereof. The outer teeth 140 each have a long side extending in a direction substantially parallel to the axial direction X. The extension direction of the long side of the outer teeth 140 may be modified as required. In one embodiment, the long side of each outer tooth on the first connection portion may extend in a direction not parallel to the axial direction X. The second connection portion 15 is arranged at the outer end of the second side portion 13, and the second side portion 13 is located between the central portion 11 and the second connection portion 15. The second connection portion 15 has outer teeth 150 on an outer surface thereof. The outer teeth 150 each have a long side extending in a direction substantially parallel to the axial direction X. The extension direction of the long side of the outer teeth 150 may be modified as required. In one embodiment, the long side of each outer tooth on the second connection portion may extend in a direction not parallel to the axial direction X. The first connection portion 14 and the second connection portion 15 can be respectively connected to the left and right crank arms being respectively connected to the left and right bike pedals. In addition, in other embodiments, the first connection portion 14 and the second connection portion 15 may be respectively connected to two robotic arms such that the shaft 10 can be served as a joint of these arms.

The plurality of first torque sensors 20 are respectively disposed in the first recesses 120. The plurality of second torque sensors 30 are respectively disposed in the second recesses 130. As such, the first torque sensors 20 and the second torque sensors 30 are respectively fixed in position in the first recesses 120 and the second recesses 130 and are prevented from falling off from the shaft 10. In this embodiment, the first side portions 12 has four first recesses 120, each of the first recesses 120 has a long side extending in a direction substantially parallel to the axial direction X, thus the torsional rigidity of the first side portion 12 along the axial direction X is significantly reduced, improving the sensitivity of the first torque sensor 20 in measuring torque. Similarly, the second side portions 13 has four second recesses 130, each of the second recesses 130 has a long side extending in a direction substantially parallel to the axial direction X, thus the torsional rigidity of the second side portion 13 along the axial direction X is significantly reduced, improving the sensitivity of the second torque sensor 30 in measuring torque. In this embodiment, the first torque sensors 20 and the second torque sensors 30 may each be a strain gauge that can detect the strain experienced by the structure it is attached and can convert the detected values into torque value, but the disclosure is not limited by the type of the strain gauge used herein.

In this embodiment, the circuit module 40 includes a circuit board 41, a reading unit 42, a wireless transmission unit 43, and an electrical energy unit 44. The circuit board 41 has a through hole 400 and a first surface 41a and a second surface 41b opposite to each other. The shaft 10 is disposed through the through hole 400. The circuit board 41 is fixed to the shaft 10. When the shaft 10 rotates about the axial direction X, the circuit board 41 is rotated about the axial direction X by the shaft 10. The reading unit 42 and the wireless transmission unit 43 are disposed on the first surface 41a of the circuit board 41. In this embodiment, the circuit board 41 surrounds the part of the first side portion 12 located close to the first connection portion 14, but the position of which is exemplary. In other embodiments, the circuit board 41 may be arranged to surround the part of the second side portion 13 located close to the second connection portion 15. In other embodiments, the circuit board 41 may be arranged to surround the central portion 11.

In this embodiment, the reading unit 42 is disposed on the circuit board 41 and is electrically connected to the first torque sensors 20 and the second torque sensors 30. The reading unit 42 is used to receive a first sensing signal generated by the first torque sensor 20 and a second sensing signal generated by the second torque sensor 30. The wireless transmission unit 43 is disposed on the circuit board 41 and is electrically connected to the reading unit 42 via the circuit board 41. The wireless transmission unit 43 is for use of transmission of the first sensing signal and the second sensing signal.

Figure 3:
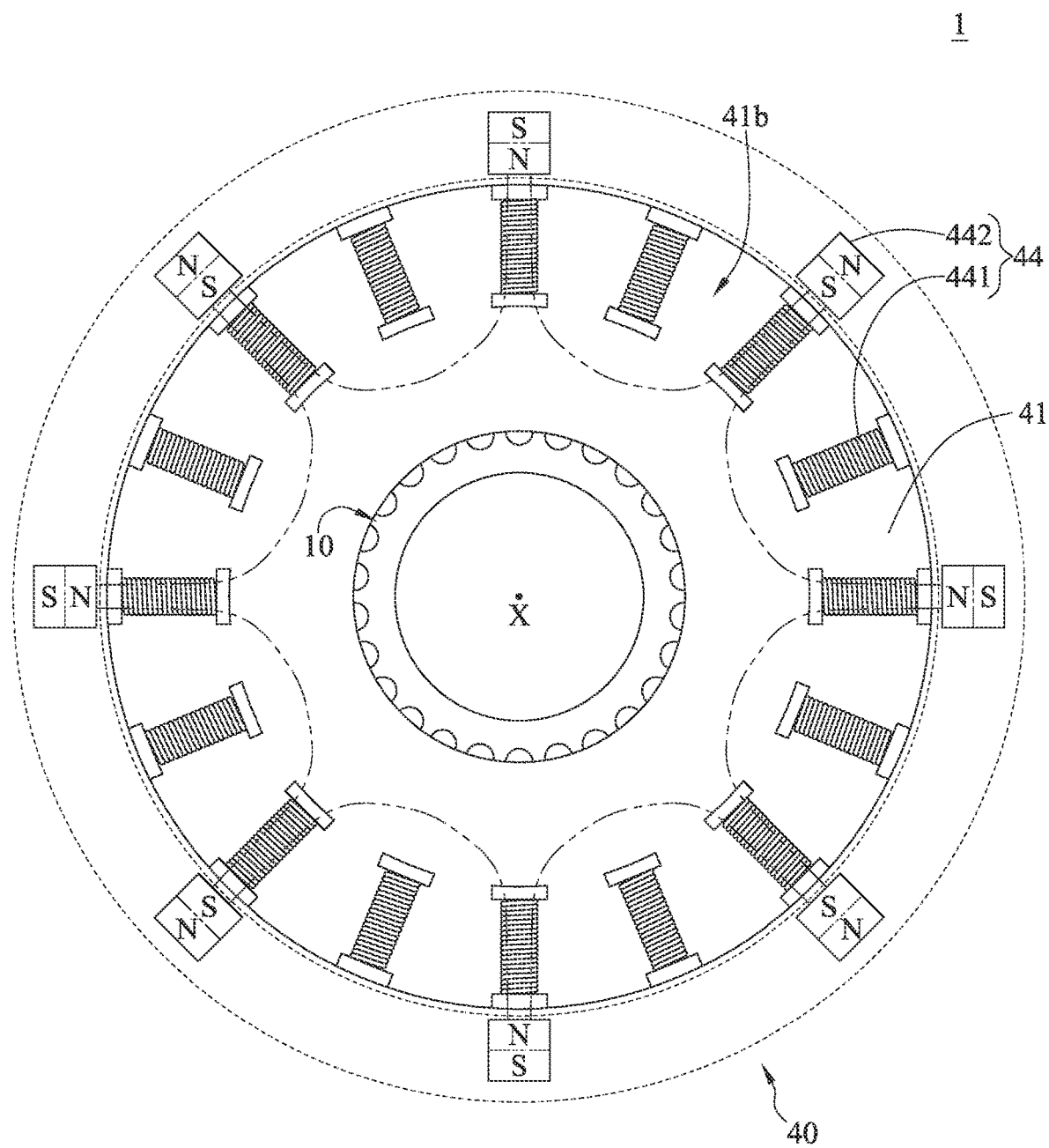
FIG. 3 is a cross-sectional view of the spindle shaft device in FIG. 1.

Referring to FIGS. 1 and 3, where FIG. 3 is a cross-sectional view of the spindle shaft device in FIG. 1.

In this embodiment, the electrical energy unit 44 has sixteen coils 441 and eight magnets 442, but the number of which is exemplary and can be modified as required. In this embodiment, the coils 441 are disposed on the second surface 41b of the circuit board 41. The coils 441 are electrically connected to the reading unit 42 and the wireless transmission unit 43 via the circuit board 41. The shaft 10 is rotatable with respect to the magnets 442 about the axial direction X. The coils 441 can be moved relative to the magnets 442 by being driven by the shaft 10 and thus generating electrical energy.

While the shaft 10 is driving the coils 441 to rotate relative to the magnets 442, electric current is generated for current magnetic effect and thereby the electrical energy unit 44 converting kinetic energy into electric energy. The electric current generated in the coils 441 is for use of the operation of the reading unit 42 and the wireless transmission unit 43. In the disclosure that the spindle shaft device 1 is applied to a bicycle, the magnets 442 may be arranged on a proper area of a bicycle frame, such as a seat tube or the joint of seat stays. In this embodiment, as shown in FIG. 3, the magnets 442 each have a N pole and a S pole, among these magnets 442, a half of the magnets 442 are arranged in a way of making the N pole face towards the shaft 10, that is, their S poles are located farther away from the shaft 10 than the N poles. The other half of the magnets 442 are arranged in a way of making the S pole face towards the shaft 10, that is, their N poles are located farther away from the shaft 10 than the N poles. Meanwhile, every two adjacent magnets 442 have opposite poles facing towards the shaft 10. In one embodiment, when one of the magnets 442 have its N pole facing towards the shaft 10, the magnets 442 adjacent thereto have their S poles facing towards the shaft 10. In other words, the N poles and S poles are arranged in an alternate manner with respect to the shaft 10. In FIG. 3, the dash-dotted lines schematically represent the lines of magnetic force.

Figure 4:
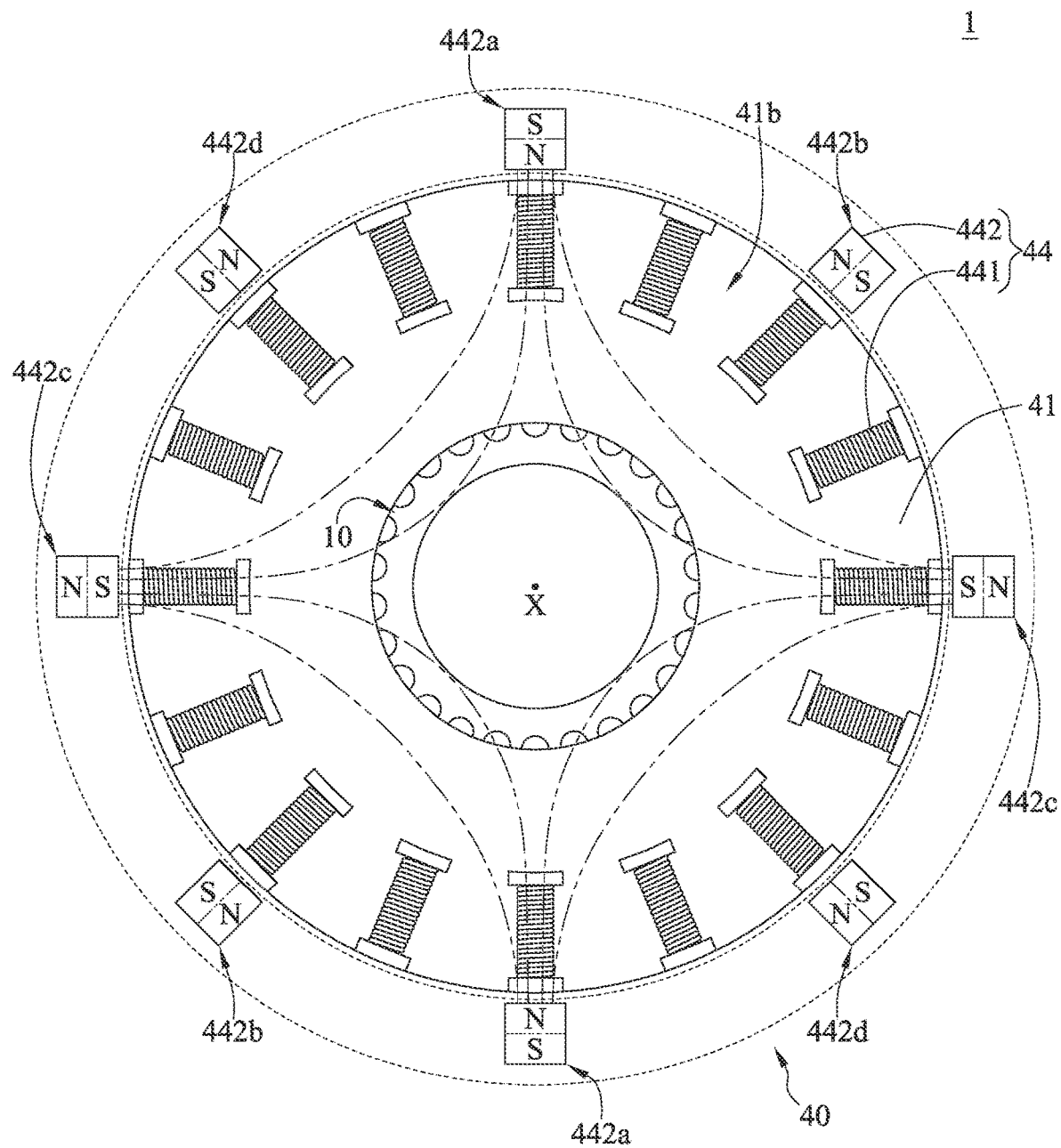
FIG. 4 shows another arrangement of magnets of the spindle shaft device.

Then, referring to FIG. 4, there is shown another arrangement of magnets of the spindle shaft device. In this embodiment, the magnets 442 are arranged in a Halbach array to augment the magnetic field facing towards the shaft 10. As shown, the magnets 442 includes two first magnets 442a, two second magnets 442b, two third magnets 442c, and two fourth magnets 442d, which are divided into two groups, and each group is one first magnet 442a, one second magnet 442b, one third magnet 442c, and one fourth magnet 442d which are sequentially arranged about the shaft 10, where the first magnets 442a face towards the shaft 10 with their N poles, the second magnets 442b have their joint surfaces between the N pole and S pole arranged in a radial manner and have their N poles facing towards the first magnet 442a and S poles facing towards the third magnet 442c, the third magnets 442c face towards the shaft 10 with their S poles, and the fourth magnet 442d have their joint surfaces between the N pole and S pole arranged in a radial manner and have their S poles facing towards the third magnet 442c and their N poles facing towards the first magnet 442a. In FIG. 4, the dash-dotted lines schematically represent the lines of magnetic force.

Figure 5:
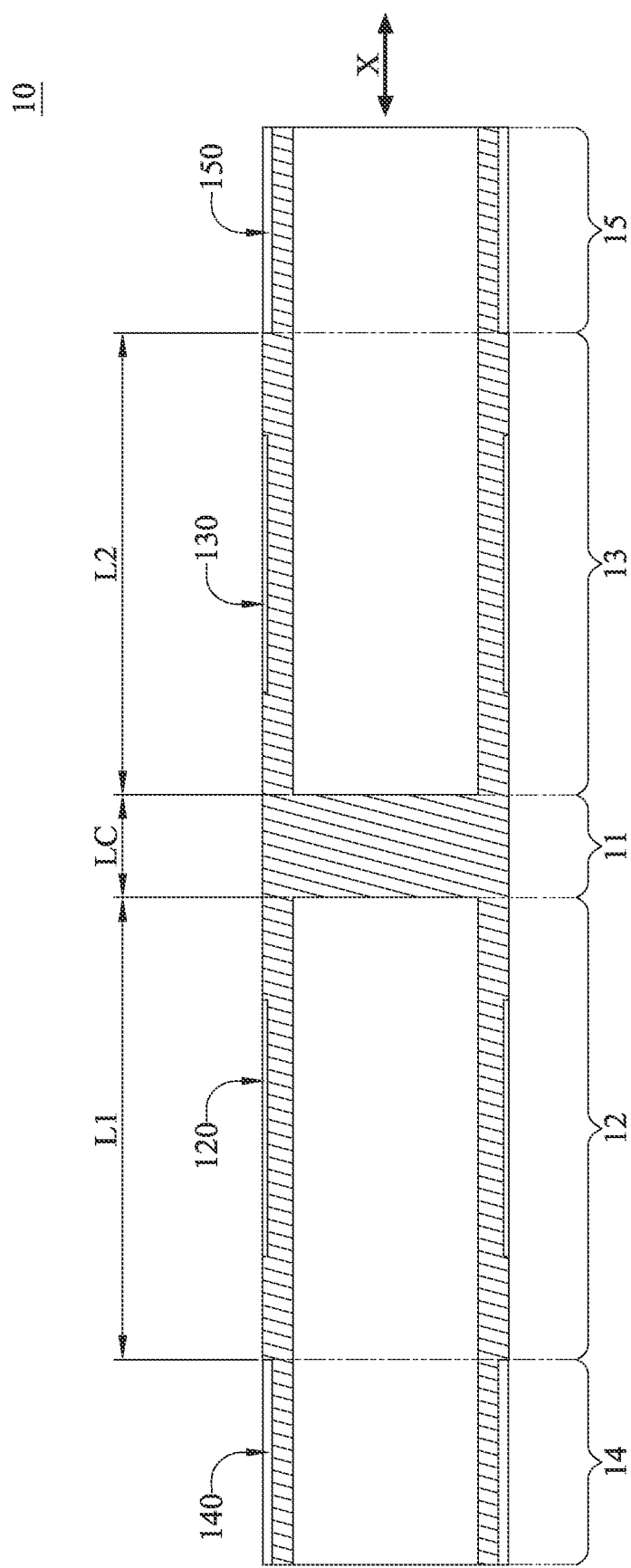
FIG. 5 a cross-sectional side view of the shaft in FIG. 2.

Referring to FIG. 5, there is shown a cross-sectional side view of the shaft in FIG. 2.

In this embodiment, the central portion 11 of the shaft 10 is solid, and the first side portion 12 and second side portion 13 of the shaft 10 are hollow. As shown, the first side portion 12 and the second side portion 13 each have a cylindrical internal space. The central portion 11 has a central torsional rigidity with respect to the axial direction X. The first side portion 12 has a first torsional rigidity with respect to the axial direction X. The second side portion 13 has a second torsional rigidity with respect to the axial direction X. Since the central portion 11 is solid while the first side portion 12 and the second side portion 13 are both hollow, the central portion 11 has a polar moment of inertia which is greater than that of the first side portion 12 and is greater than that of the second side portion 13. The polar moment of inertia is $Ip=\int \rho^2 dA$, where dA denotes an unit area of cross section, $\rho$ denotes a distance from dA to a reference point. In general, the torsional rigidity is the result of multiplying the value of shear modulus G by the polar moment of inertia (i.e., torsional rigidity=G×Ip), thus the torsional rigidity is proportional to Ip. Thus, the first torsional rigidity first side portion 12 is less than the central torsional rigidity of the shaft 10, and the second torsional rigidity of the second side portion 13 is less than the central torsional rigidity of the shaft 10.

The more the number of the first recesses 120, the smaller the first torsional rigidity of the first side portion 12. And the deeper the first recess 120, the smaller the first torsional rigidity of the first side portion 12. In addition, the more the number of the second recesses 130, the smaller the second torsional rigidity of the second side portion 13. And the deeper the second recess 130, the smaller the second torsional rigidity of the second side portion 13.

Figure 6:
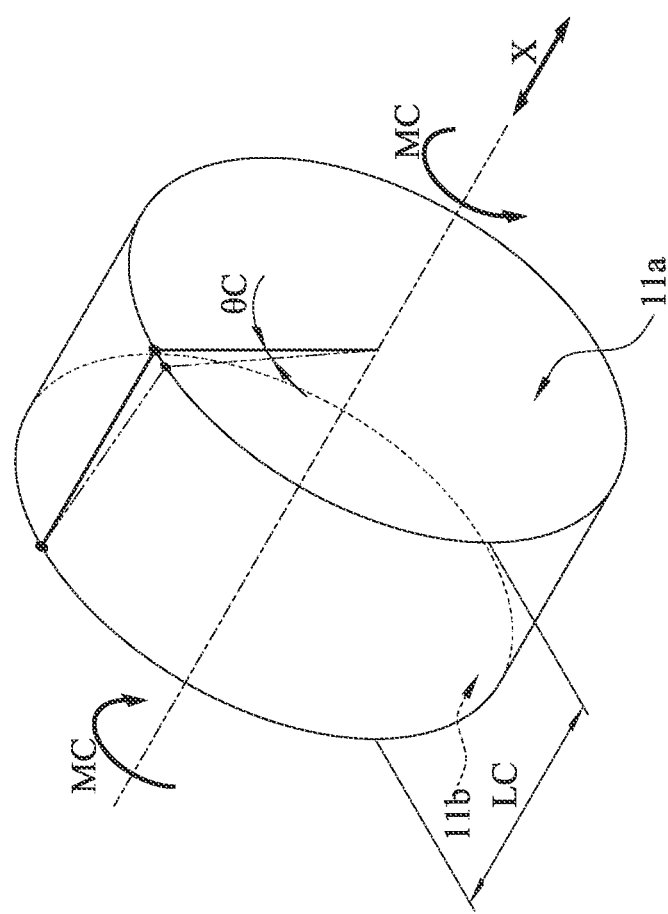
FIG. 6 shows the parameters required for defining or calculating the central torsional rigidity of the central portion in FIG. 5.

Referring to FIG. 6, FIG. 6 shows the parameters required for defining or calculating the central torsional rigidity of the central portion in FIG. 5. In FIG. 6, the central portion 11 is illustrated in a cylindrical shape, but the shape of the central portion 11 is exemplary for explaining how to obtain the value of its central torsional rigidity.

As shown in FIG. 6, the central portion 11 has a length LC. When a torque MC about the axial direction X is applied to the central portion 11, two opposite ends 11a and 11b of the central portion 11 are rotated with respect to each other by an angle θC. At this moment, KC denotes the central torsional rigidity of the central portion 11, and KC is obtained by multiplying the value of the torque MC by the length LC and then divided by the value of angle θC, resulting in the following equilibrium equation: KC=MC×LC/θC, where the unit for θC is the radian(rad).

Figure 7:
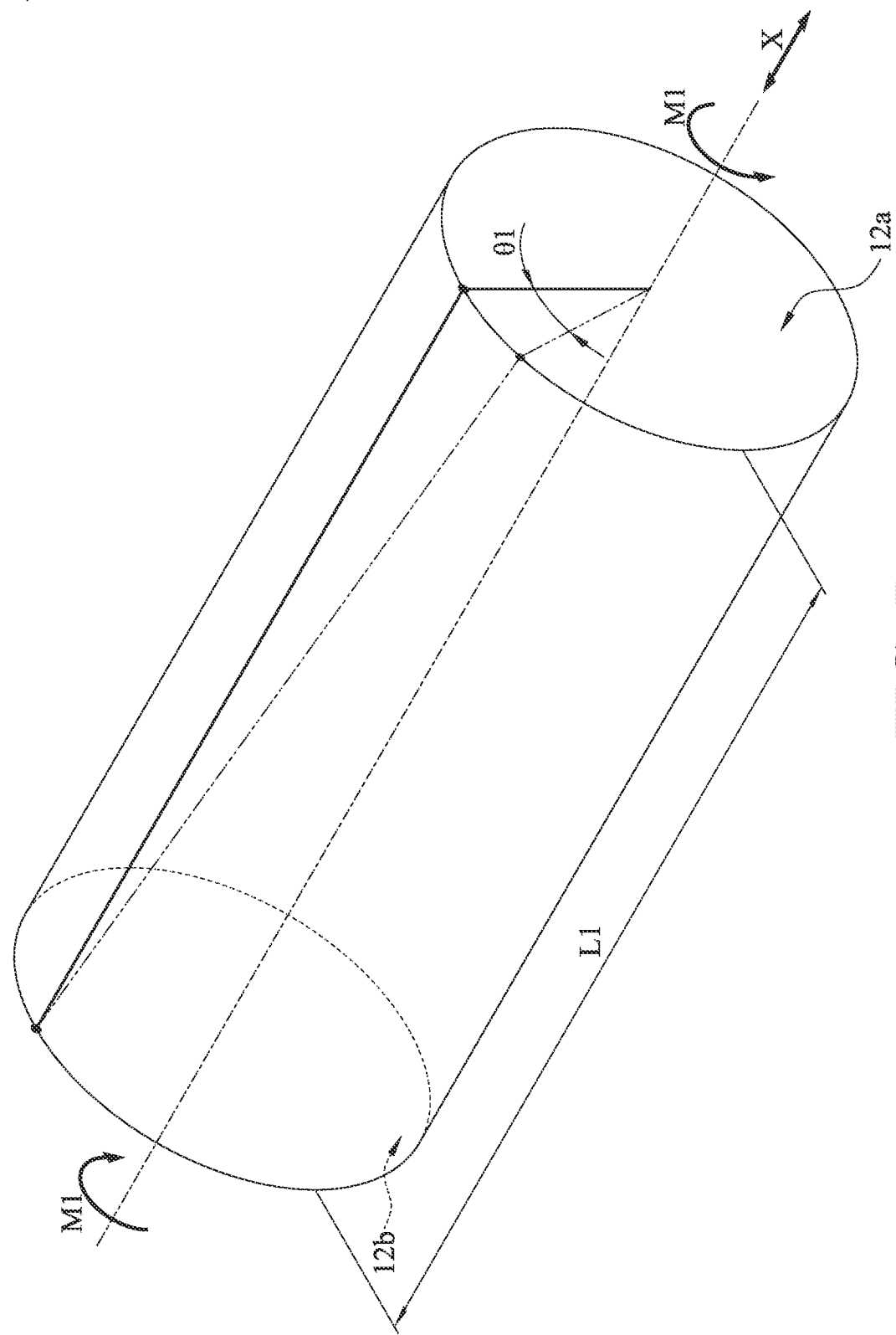
FIG. 7 shows the parameters required for defining or calculating the first torsional rigidity of the first side portion in FIG. 5.

Referring to FIG. 7, FIG. 7 shows the parameters required for defining or calculating the first torsional rigidity of the first side portion in FIG. 5. In FIG. 7, the first side portion 12 is illustrated in a cylindrical shape, but the shape of the first side portion 12 is exemplary for explaining how to obtain the value of its first torsional rigidity.

As shown in FIG. 7, the first side portion 12 has a length L1. When a torque M1 about the axial direction X is applied to the first side portion 12, two opposite ends 12a and 12b of the first side portion 12 are rotated with respect to each other by an angle θ1. At this moment, K1 denotes the first torsional rigidity of the first side portion 12, and K1 is obtained by multiplying the value of the torque M1 by the length L1 and then divided by the value of angle θ1, resulting in the following equilibrium equation: K1=M1×L1/θ1, where the unit for θ1 is the radian(rad).

Figure 8:
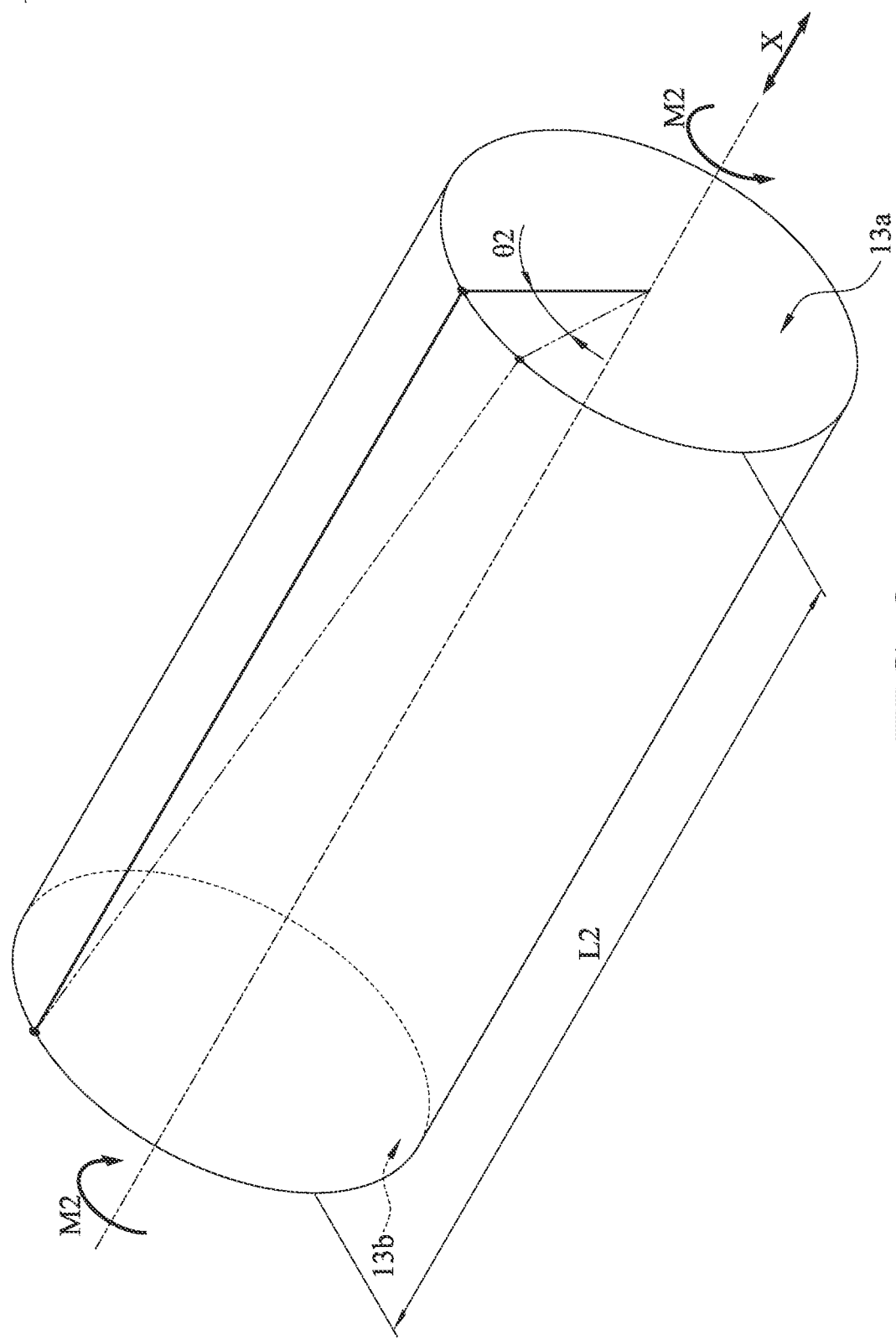
FIG. 8 shows the parameters required for defining or calculating the second torsional rigidity of the second side portion in FIG. 5.

Referring to FIG. 8, FIG. 8 shows the parameters required for defining or calculating the second torsional rigidity of the second side portion in FIG. 5. In FIG. 8, the second side portion 13 is illustrated in a cylindrical shape, but the shape of the second side portion 13 is exemplary for explaining how to obtain the value of its second torsional rigidity.

As shown in FIG. 8, the second side portion 13 has a length L2. When a torque M2 about the axial direction X is applied to the second side portion 13, two opposite ends 13a and 13b of the second side portion 13 are rotated with respect to each other by an angle θ2. At this moment, K2 denotes the second torsional rigidity of the second side portion 13, and K2 is obtained by multiplying the value of the torque M2 by the length L2 and then divided by the value of the angle θ2, resulting in the following equilibrium equation: K2=M2×L2/θ2, where the unit for θ2 is the radian(rad). The central torsional rigidity is at least 1.15 times greater than the first torsional rigidity and is at least 1.15 times greater than the second torsional rigidity.

In this embodiment, the central portion 11 is solid, both of the first side portion 12 and the second side portion 13 are hollow and have a cylindrical internal space, the first side portion 12 and the second side portion 13 respectively have the first recesses 120 and the second recesses 130. Therefore, the polar moment of inertia of the first side portion 12 is less than the polar moment of inertia of the central portion 11 and the polar moment of inertia of the second side portion 13 is less than the polar moment of inertia of the central portion 11. Such a configuration makes the first torsional rigidity less than the central torsional rigidity and second torsional rigidity less than the central torsional rigidity. In other embodiments, as given below, can achieve the same result using other configurations.

In other embodiments, the central portion 11, the first side portion 12, and the second side portion 13 may all be hollow, and the first side portion 12 and the second side portion 13 respectively have the first recesses 120 and the second recesses 130.

In other embodiments, the central portion 11, the first side portion 12, and the second side portion 13 may all be solid, and the first side portion 12 and the second side portion 13 respectively have the first recesses 120 and the second recesses 130.

In other embodiments, the central portion 11 may be solid, the first side portion 12 and the second side portion 13 may be hollow but their internal spaces may be in are in a polygonal columnar shape, and the first side portion 12 and the second side portion 13 respectively have the first recesses 120 and the second recesses 130.

In other embodiments, the central portion 11, the first side portion 12, and the second side portion 13 may all be hollow, and the first side portion 12 and the second side portion 13 respectively have recesses in a shape different than that of the first recesses 120 and the second recesses 130.

In other embodiments, the central portion 11, the first side portion 12, and the second side portion 13 may all be solid, and the first side portion 12 and the second side portion 13 respectively have recesses in a shape different than that of the first recesses 120 and the second recesses 130.

In other embodiments, the central portion 11, the first side portion 12, and the second side portion 13 may all be solid, but the central portion 11 has a cross-section greater than that of the first side portion 12 and greater than that of the second side portion 13.

Since the first torsional rigidity and the second torsional rigidity are both less than the central torsional rigidity, the interference between the torque applied to the first side portion 12 and the torque applied to the second side portion 13 is significantly reduced. That is, the first side portion 12 and the second side portion 13 are prevented from affecting each other when torque is applied thereto. In one embodiment that the spindle shaft device 1 is served as a petal spindle installed between two bicycle crank arms, the spindle shaft device 1 can prevent torque applied to the first side portion 12 from transmitting to the second side portion 13, thereby preventing the torque applied to the first side portion 12 from interfering the second torque sensors 30 for detecting the actual torque applied to the second side portion 13. Similarly, the spindle shaft device 1 can prevent torque applied to the second torque sensor 30 from transmitting to the first side portion 12, preventing the torque applied to the second torque sensors 30 from interfering the first torque sensors 20 for detecting the actual torque applied to the first side portion 12. As such, the torque measurement of the first side portion 12 and the torque measurement of the second side portion 13 can significantly reduce the influence on each other, thereby achieving accurate torque measurement of the first side portion 12 and the second side portion 13. In the above application, the torques respectively measured by the first torque sensors 20 and the second torque sensors 30 may respectively be caused by the force loaded on the left and right side pedals. Thus, the spindle shaft device 1 not only can measure the overall torque applied to the shaft 10 but also can respectively obtain the torques respectively produced by the left side pedal and right side pedal. As such, with the configuration that the first torsional rigidity and the second torsional rigidity are both less than the central torsional rigidity, the spindle shaft device is able to correctly record the force applied to the left side pedal and the force applied to the right side pedal respectively. The forces recorded by the spindle shaft device can increase the training effectiveness of the bicycle rider.

According to the torque sensors discussed in the above embodiments, due to one or more torque sensors attached to the shaft, the torque applied to the shaft can be accurately and timely obtained. Also, since the first torsional rigidity and the second torsional rigidity are both less than the central torsional rigidity, the torque applied to the first side portion and the torque applied to the second torque sensor are prevented from interfering with each other. As such, the torque measurement of the first torque sensor and the torque measurement of the second torque sensor can significantly reduce influence on each other, thereby achieving accurate torque measurements of the first side portion and the second side portion.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A spindle shaft device, comprising:
   a shaft, extending along an axial direction, wherein the shaft comprises a first side portion, a second side portion, and a central portion which is connected to and located between the first side portion and the second side portion, the central portion has a central torsional rigidity with respect to the axial direction, the first side portion has a first torsional rigidity with respect to the axial direction, the second side portion has a second torsional rigidity with respect to the axial direction, the first torsional rigidity is smaller than the central torsional rigidity, the second torsional rigidity is smaller than the central torsional rigidity;
   a first torque sensor, disposed on the first side portion; and
   a second torque sensor, disposed on the second side portion.

2. The spindle shaft device according to claim 1, wherein the central torsional rigidity is at least 1.15 times greater than the first torsional rigidity and is at least 1.15 times greater than the second torsional rigidity.

3. The spindle shaft device according to claim 1, wherein at least one cross-section of the central portion has a polar moment of inertia greater than a polar moment of inertia of at least one cross-section of the first side portion and greater than a polar moment of inertia of at least one cross-section of the second side portion.

4. The spindle shaft device according to claim 3, wherein the central portion is solid, and the first side portion and the second side portion are hollow.

5. The spindle shaft device according to claim 4, wherein the first side portion has at least one first recess, and the second side portion has at least one second recess.

6. The spindle shaft device according to claim 5, wherein the first torque sensor is disposed at the at least one first recess, and the second torque sensor is disposed at the at least one second recess.

7. The spindle shaft device according to claim 5, wherein the at least one first recess has a long side extending in a direction substantially parallel to the axial direction, and the at least one second recess has a long side extending in a direction substantially parallel to the axial direction.

8. The spindle shaft device according to claim 3, wherein the central portion has a cross-section that is greater than a cross-section of the first side portion and is greater than a cross-section of the second side portion.

9. The spindle shaft device according to claim 3, wherein the central portion, the first side portion and the second side portion are both hollow, the first side portion has at least one first recess, and the second side portion has at least one second recess.

10. The spindle shaft device according to claim 3, wherein the central portion, the first side portion and the second side portion are both solid, the first side portion has at least one first recess, and the second side portion has at least one second recess.

11. The spindle shaft device according to claim 3, wherein the central portion, the first side portion and the second side portion are both hollow, and the first side portion and the second side portion respectively have recesses of different shapes.

12. The spindle shaft device according to claim 3, wherein the central portion, the first side portion and the second side portion are both solid, and the first side portion and the second side portion respectively have recesses of different shapes.

13. The spindle shaft device according to claim 1, further comprising a circuit module having a through hole, wherein the shaft is disposed through the through hole, and the circuit module is electrically connected to the first torque sensor and the second torque sensor.

14. The spindle shaft device according to claim 13, wherein the circuit module comprises a reading unit and a wireless transmission unit, the reading unit is electrically connected to the first torque sensor and the second torque sensor and configured for receiving a first sensing signal of the first torque sensor and a second sensing signal of the second torque sensor, the wireless transmission unit is electrically connected to the reading unit and is configured for transmitting the first sensing signal and the second sensing signal.

15. The spindle shaft device according to claim 14, wherein the circuit module further comprises an electrical energy unit electrically connected to the reading unit and the wireless transmission unit and configured for converting kinetic energy into electrical energy.

16. The spindle shaft device according to claim 15, wherein the electrical energy unit comprises at least one coil and at least one magnet, the at least one coil is fixed to the shaft, the at least one coil and the shaft are rotatable relative to the at least one magnet about the axial direction to produce electric current through the at least one coil.

17. The spindle shaft device according to claim 16, wherein the at least one magnet comprises a plurality of magnets, each of the plurality of the magnets has a N pole and a S pole, the plurality of magnets surround the shaft, a half of the plurality of magnets have the N poles thereof facing towards the shaft, the other half of the plurality of magnets have the S poles thereof facing towards the shaft, every two of the plurality of magnets located adjacent to each other have opposite poles facing towards the shaft, the N poles and the S poles are arranged in an alternate manner with respect to the shaft.

18. The spindle shaft device according to claim 16, wherein the at least one magnet comprises a plurality of magnets being a multiple of 4, the plurality of magnets surround the shaft, the plurality of magnets are divided into at least one group each comprising a first magnet, a second magnet, a third magnet, and a fourth magnet, the first magnet faces towards the shaft with the N pole thereof, the second magnet has a joint surface between the N pole and the S pole thereof arranged in a radial manner and has the N pole thereof facing towards the first magnet and the S pole thereof facing towards the third magnet, the third magnet faces towards the shaft with the S pole thereof, the fourth magnet has a joint surface between the S pole and the N pole thereof arranged in a radial manner and has the S pole thereof facing towards the third magnet and has the N pole thereof facing towards the first magnet.

19. The spindle shaft device according to claim 1, wherein the shaft further comprises a first connection portion and a second connection portion, the first connection portion is disposed at the first side portion, the first side portion is located between the central portion and the first connection portion, the second connection portion is disposed at the second side portion, the second side portion is located between the central portion and the second connection portion, and the first connection portion and the second connection portion each have an outer tooth.

20. The spindle shaft device according to claim 1, wherein the first torque sensor and the second torque sensor are strain gauges.

* * * * *